United States Patent [19]

Halvorsen

[11] Patent Number: 4,543,762
[45] Date of Patent: Oct. 1, 1985

[54] FLEXIBLE TERMINAL POINT FOR LATTICE WORK CONSTRUCTION

[75] Inventor: Finn Halvorsen, Lidingö, Sweden
[73] Assignee: Scanding Byggkonsult Aktiebolag, Lidingö, Sweden
[21] Appl. No.: 639,521
[22] PCT Filed: Oct. 8, 1981
[86] PCT No.: PCT/SE81/00291
§ 371 Date: May 28, 1982
§ 102(e) Date: May 28, 1982
[87] PCT Pub. No.: WO82/01388
PCT Pub. Date: Apr. 29, 1982

Related U.S. Application Data

[63] Continuation of Ser. No. 387,836, May 28, 1982.

[30] Foreign Application Priority Data

Oct. 15, 1980 [SE] Sweden .................. 8007221

[51] Int. Cl.[4] .................................................. E04B 1/24
[52] U.S. Cl. ........................................ 52/660; 52/693;
244/131; 403/195; 403/201
[58] Field of Search ............... 52/637, 638, 693, 660;
244/117 R, 125, 131; 403/195, 201

[56] References Cited

U.S. PATENT DOCUMENTS

| 1,500,235 | 7/1924 | Clark | 52/226 |
| 1,545,667 | 7/1925 | Kusterle | 403/201 |
| 1,846,772 | 2/1932 | Wallis | 52/638 |
| 1,946,408 | 2/1934 | Loudy | 244/131 |
| 2,391,275 | 12/1945 | Shaw | 244/131 |

FOREIGN PATENT DOCUMENTS

| 1303132 | 7/1962 | France | 403/195 |
| 2352199 | 12/1977 | France | 403/201 |
| 124819 | 4/1919 | United Kingdom | 244/131 |
| 150753 | 9/1920 | United Kingdom | 244/131 |

Primary Examiner—James L. Ridgill, Jr.
Attorney, Agent, or Firm—Larson and Taylor

[57] ABSTRACT

A flexible terminal point, specially for lattice work constructions comprising a tube formed terminal means (5), which is secured to one of the bars (1), and which at its one end (7) receives the other bar (3) in a manner which allows limited flexibility. Through the tubelike terminal means (5) runs one or several tie-rods, by which the terminal means (5) is attached to the other bar, and by which the terminal means can be pretensioned, whereby load changes in the other bar (3) only to a lesser degree cause strain changes in the tie-rod (15) while the major part of the loads in the other bar (3) is taken up by the tube-like terminal means (5) which is set under compression forces. Coupling between terminal means (5) and the movable bar (3) is effected by means of a bearing socket via a rubber pad (13) or spherical surfaces in the terminal means (5) and movable bar (3). The tie-rod (15) can be formed as one or several tie-rods, steel cables, wires or such, which can be tensioned and locked by known methods for pretensioned constructions.

12 Claims, 8 Drawing Figures

FLEXIBLE TERMINAL POINT FOR LATTICE WORK CONSTRUCTION

This application is a continuation of application Ser. No. 387,836 filed May 28, 1982.

The present invention generally relates to a flexible terminal point for lattice work constructions, and more particularly to such constructions subjected to dynamic forces.

Dynamic forces are usual when considering lattice work constructions of many different kinds, for example with buildings and parts of buildings such as floors and roofs and the like which are subjected to varying forces, with pillars, towers, masts, bridges other types of constructions which can be subjected to gravitational loads or side loads as a result of strong winds and the like. A special field where large dynamic forces arise are lattice work constructions which wholly or partially are in water and are there subjected to varying loads and high dynamic stresses resulting from wind and wave. Examples of such constructions are bridge foundations, breakwaters harbour piers docks or work platforms e.g. oil derricks.

The elements of a lattice work construction which are brought to a single terminal point always attempt to change the relative angles between the elements as the construction is subjected to normal loading. Unusual forces directly applied upon at the cross bars of the lattice work construction increase the need for flexibility of the terminal points. Conventionally, the design of lattice work terminal points are such that relative changes in the angles between the elements is restricted, creating concentrations of stress in an area where the material's fatigue strength is already reduced as a result of directional changes of the forces applied. The danger of fatigue failure is exaggerated further in cases where the inflicted loads change direction and cause stresses with changing sign in the terminal point's fittings.

To eliminate the named problems it has been suggested that the terminal points fitting should be made flexible, so that the lattice work element is allowed in some degree to be movable, reducing the risk for fatigue failure. Such flexibility of terminal points fittings is known through for example, the German Pat. Nos. 1 459 963 and 2 421 758. These terminal points fittings are formed as ball joints, where the ball and socket are fastened in the lattice work element and terminal plate or the like of the lattice work. These known types of joints are intended as simple methods of assembly and also allow for a certain movement between the different parts. These constructions are however, mainly suitable for lighter lattice work dimensions, and have the disadvantage that terminal point fittings can be subjected to both tension and compression stresses. Tension forces can cause the edges of the socket which partly encloses the ball to be drawn out, giving rise to play even to the extent that the ball can be pulled out of the socket. To make it possible for a de-mountable ball joint, or of the ball from its socket, the known constructions are made up of a large number of parts, of which many must be adjusted or tightened on assembly.

This invention endeavours to solve the problem of a simple and effective terminal point fitting, which allows a certain flexibility between the elements of the lattice work, which is simple to assemble and adjust, and which is well suited for large and heavy lattice work constructions.

A special aspect of this invention concerns the elimination of problems caused by dynamic forces of changing direction in terminal points fittings. Pre-tensioning of the terminal point causes the directional changes of dynamic loads to result in stresses of varying magnitude only, and the stress variations are reduced considerably in the pre-tensioned terminal point means by the transference of forces to the compressed parts of the fitting. This construction achieves much improved properties of strength in comparison with constructions which allow directional changes of stresses from tension to compression.

A development of the invention is that the terminal point fitting is formed with three different but co-acting elements, which are arranged to bring about the named pre-tension, and where one element is subjected to compression forces only and another element to tension forces only. By this arrangement the possibility arises of designing the tensioned parts of the means considering only tensile stress properties, and the compressed parts which are not so sensitive to varying loads can be made of simple material and design. The junction means is arranged to distribute the forces exerted thereon at the terminal point in a direction generally tangential as opposed to being normal to the surface of the body member in that vicinity.

Futher characteristics of the invention will be evident from the following detailed specification in which reference will be made to the accompanying drawings.

In the drawings

FIG. 1 digrammatically shows a part of a lattice work construction of simple type.

Figure 1:
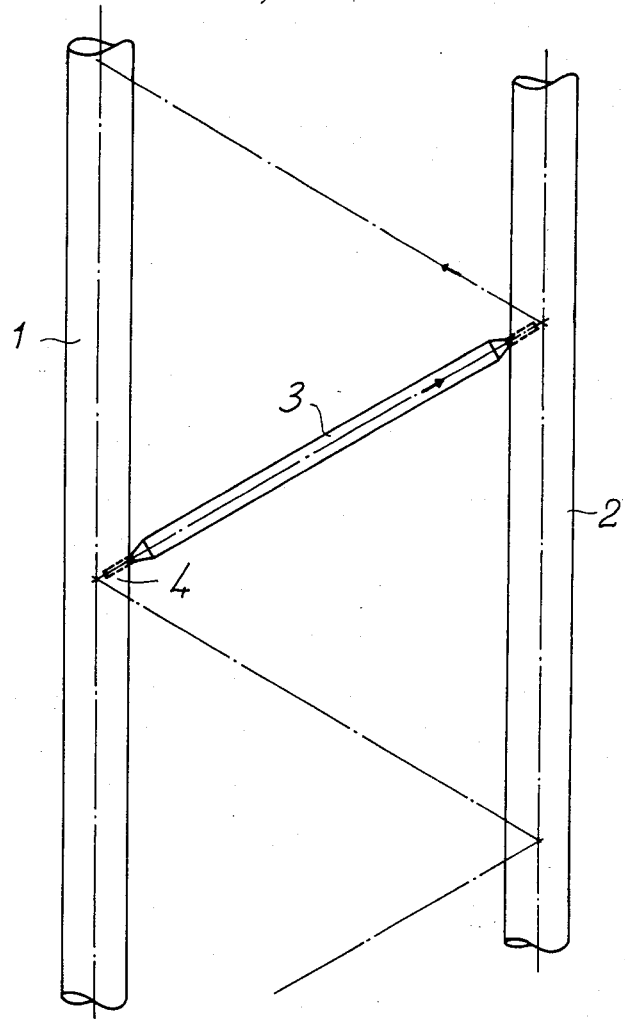
Figure 2:
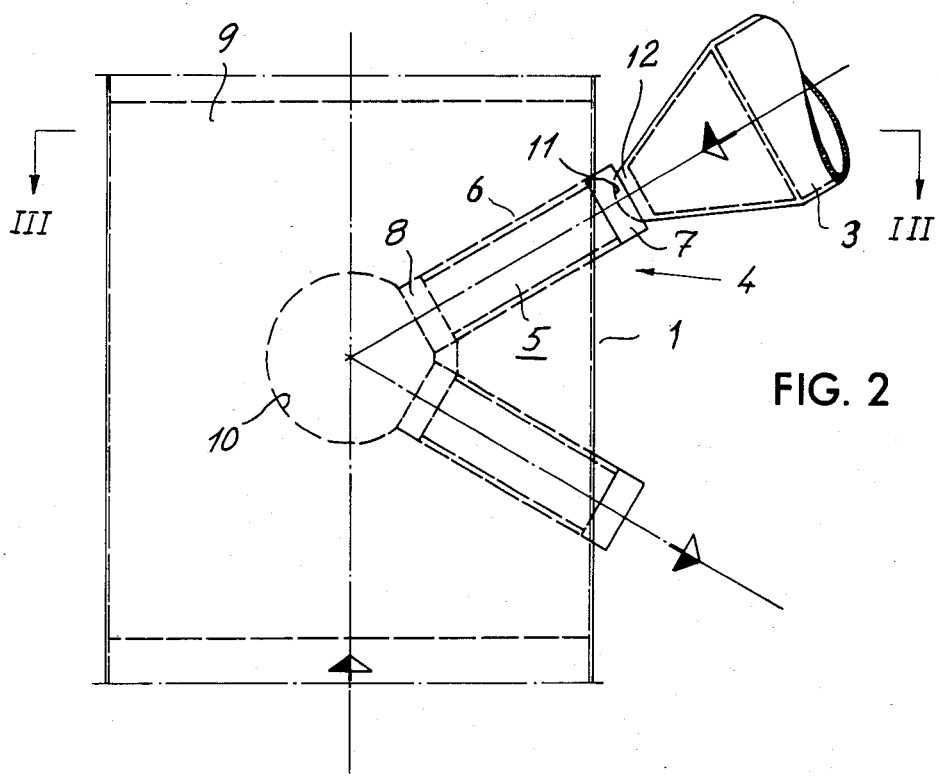
FIG. 2 shows on a larger scale a part of a lattice work construction in FIG. 1.
Figure 3:
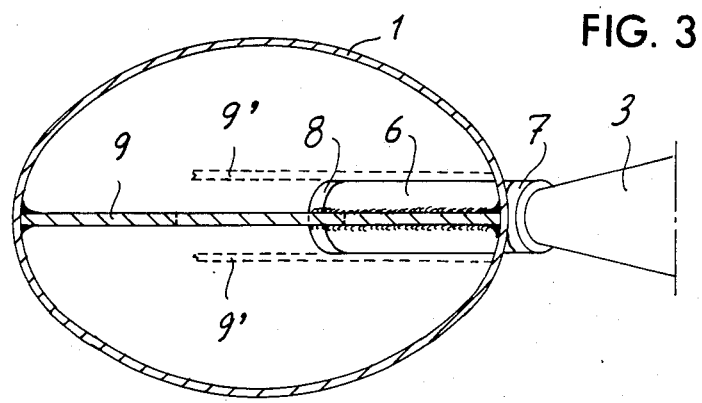
FIG. 3 shows a section through line III—III in FIG. 2.

FIG. 1 is an example of a lattice work construction, which comprises two struts or bars 1, 2 with several zig-zag cross bars 3 between them, of which only one is drawn. The cross bars 3 are attached to the struts by terminal point fittings, which are shown diagrammatically in FIGS. 2 and 3. The cross bars 3 are at each end attached by a terminal means 5 comprising a terminal tube 6 with an outer end 7 and an inner end 8. To secure the terminal means 5, the strut or bar 1 is provided with a diametrial junction-plate 9, which is welded to the inside of the strut or bar, and which has a center hole 10, the purpose of which will be described below. Terminal means 5 runs at an angle through the side of and into the strut or bar 1, and is inserted into the junction plate 9 so that the inner end 8 lies flush with the periphery of hole 10 while the outer end 7 is positioned outside the strut or bar.

In the shown example terminal means 5 is circular, but can also be square, rectangular or any other shape. In a similar manner, terminal means 5 is secured in a single junction plate, but as can be seen by the dotted lines in FIG. 3, the construction can be arranged to have two junction plates 9' between which the terminal means is secured. In cases where the terminal means is formed by square or rectangular sections, the two junction plates 9' can be utilized as two of the sides of the terminal means.

Figure 4:
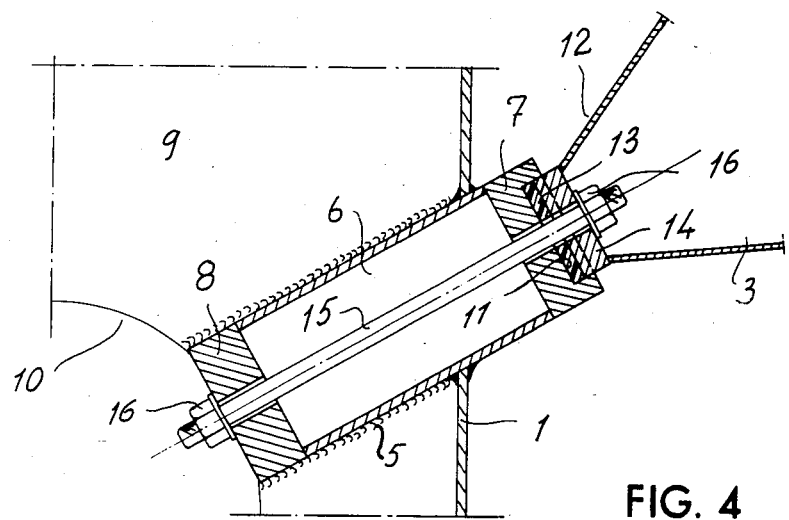
FIGS. 4, 5, 6 and 7 show four different alternative versions of the flexible terminal point according to the invention.

To achieve a terminal which is flexible in all directions, the outer end 7 of the terminal means is formed as a bearing socket 11, which flexibly receives the outer end 12 of the cross bar 3. FIG. 4 shows that the flexibility of the joint is effected by a rubber pad or other elastic material inserted in the bearing socket 11, and by forming the outer end of the cross bar to a flat or rounded end-piece 14, which lies against the elastic pad 13 and through which runs a tie-rod 15, threaded at both ends, with nuts 16, 17 to enable securing of the cross bar 3 to the terminal means 5.

A terminal means is normally subjected to varying loads of different kinds, of which the most unfavourable can cause changing tension and compression stresses. A load curve of such unfavourable loading is shown by curve 17 of FIG. 8. If however the terminal means is pre-tensioned, the curve 17 will be elevated as shown in the diagram, and if pre-tensioning is sufficient the curve will lie completely over the zero axis, whereby the terminal means is subjected to stresses of only one sign. This is shown by curve 18. By diverting forces into a separate compression element 5 and a separate tension element 15, the compression element 5 can be arranged to have a larger area and thereby a lower stress concentration and can therefore be manufactured from conventional low grade material. The tension element 15 can on the other hand be made from high grade cold drawn material, where the area can be kept small and the stress factor high. If this terminal is pre-tensioned and is then subjected to changing pull and push forces from the cross bar 3 and conveyed to junction plate 9, the said forces are separated and the push forces are conveyed through the compression element 5 with the larger area, and pull forces are taken up by the tension element 15, which, due to its pre-tension, retains a virtuallly constant strain and the forces remain in proportion to the areas of the elements.

Figure 8:
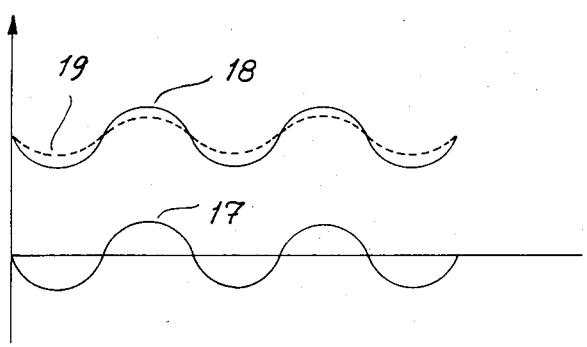
FIG. 8 shows diagramatically the pretensionings, advantageous effect upon the stress curve of the terminal means while under dynamic forces.

In FIG. 8 the curve 19 illustrates the important reduction of stress variations achieved by pre-tensioning. For dynamically loaded constructions, the magnitude of strain and number of variations of strain are crucial for their life span. Thus the terminal point is designed as a terminal means 5, which takes up all compression forces, and another means 15 which takes up tension forces. At the same time the cross bar 3 is allowed to swing freely in all directions relative to the terminal means 5 by the action of the elastic pad 13.

FIG. 4 shows that the tie-rod 15 as a stiff rod. When the cross bar 3 is subjected to large swinging movements in relation to the terminal means 5, the cross bar end piece 14 tends to lift the nut 16 by beng forced against the edge of the nut. This effect can be eliminated by making the tie-rod 15 bendable, for example by using a flexible wire or steel cable with many elements.

Figure 5:
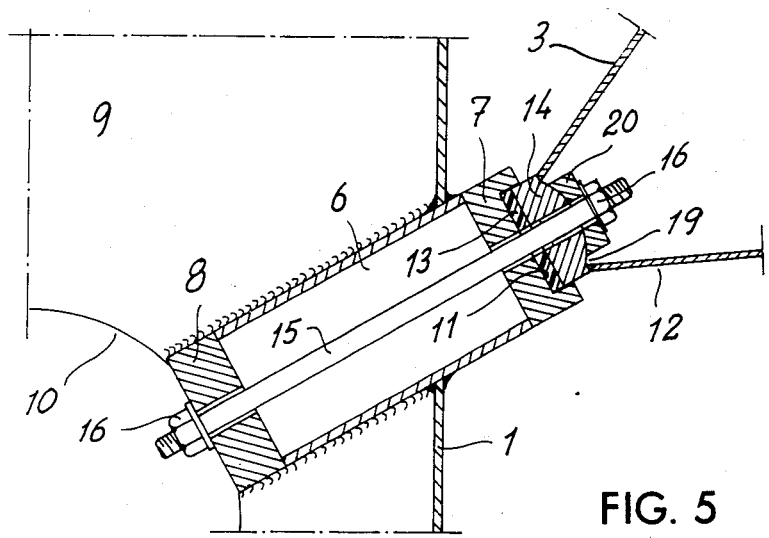

The means can even be formed as shown in FIG. 5, where the cross bar 3 and end piece 14 are shaped having a convex surface 19 away from the means 5, and between the convex surface 19 and nut 16 a concave shaped socket 20 is positioned. Suitably, the axial hole through the end-piece 14 is to some extent larger than the tie-rod 15, and the cross bar with the end-piece 14 can move in any direction, whereby the end-piece 14 slides under the matching surface of the socket 20 and the tie-rod 15 maintains its position and tension.

Figure 6:
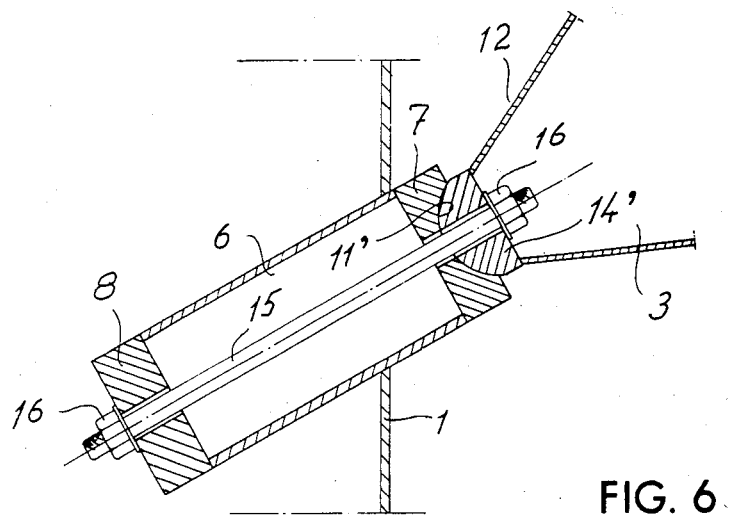
Figure 7:
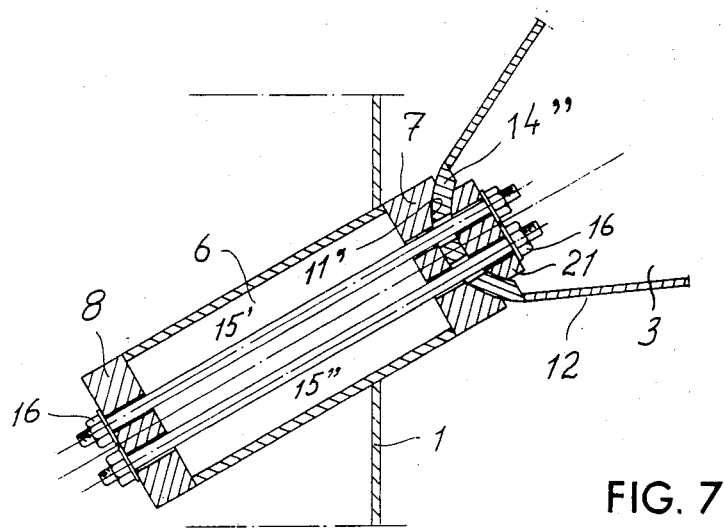

FIG. 6 shows an alternative design of the invention where the terminal means 5 outer end 7 is formed as part of a concave socket 11'0 and the cross bars endpiece 14' is matchingly convex and can slide in the socket 11'. Even in this case the nut 16, as a result of a substantial swing of the cross bar, can be partly lifted from the end-piece 14' and to eliminate this disadvantage, the means can be designed as in FIG. 7 where the end-piece 14" is formed on its inside as a concave socket matching the bearing ball 21 which remains stationary in relation to the terminal means 5 as the end piece 14" can rotate. It is shown in the figure that in this case two tie-rods 15', 15" can be used, which runs through the socket 11', the end-piece 14" and the bearing ball 21, it being obvious that one tie-rod can be used, or three or more.

It is obvious that the terminal means shown in the drawings as a plain construction can also, according to the invention, be used in three dimensional constructions and that the terminal means can also be used in situations other than lattice work constructions, where a securing method for tubes or bars is required and which must withstand strong fluctuating forces.

It will also be apparent to those skilled in the art that the drawings show embodiments of the invention as illuminating examples only and that all types of modifications may be presented in the scope of the following patent claims. For example, pretensioning of the terminal can be made by means other than the shown threaded tie-rods and the terminal means can be secured by means other tie-rods or that the terminal means can be secured by other means than the shown junction plate. However, the junction plate provides a strong securing method relative to the strut's or bar's thin material. When securing with a junction plate, advantage can be gained by centralizing the load lines from several cross bars to one point in the strut or the bar, which optimizes an advantageous loading situation.

I claim:

1. A terminal point for connecting a cross bar of a lattice work to a support strut of the lattice work, wherein the cross bar and the support strut are subject to static and dynamic loads therealong of both tension and compression but the terminal point is only subject to a compression load, comprising:

a junction means fixedly mounted in the support strut for distributing the forces exerted on the cross bar along a length of the support strut adjacent the terminal point;

a compression element including a tube having an inner end and an outer end protruding outwardly beyond the support strut and to which the adjacent end of the cross bar is attached, said tube being fixedly attached to said junction means and located between said junction means and the cross bar such that said compression element receives any compressive forces exerted by the cross bar on the support strut; and a tension element means for initially compressing said compression element to a load greater than any expected tension load whereby the terminal point receives only a compressive load changing in magnitude, and for attaching the cross bar to said junction means such that said tension element means receives any tension forces exerted by the cross bar on the support strut independent of said compression element and in the same manner that said compression element receives any compression forces independent of said tension element means, said tension element including at least one tie-rod extending centrally through said tube which is threaded at the end adjacent the cross bar and a nut which is received on said threaded end, said nut being used to tension said tie-rod between the inner end of said tube and the outer end of said tube adjacent said cross bar and which thereby initially compresses said compression element appropriately.

2. A terminal point for connecting a cross bar of a lattice work to a support strut of the lattice work, wherein the cross bar and the support strut are subject to static and dynamic loads therealong of both tension and compression, comprising:

a junction means fixedly mounted in the support strut for distributing compression and tension forces exerted on the cross bar along a length of the support strut adjacent the terminal point;

a compression element with a compression axis substantially parallel to the cross bar which is immovably attached to said junction means and which is located between said junction means and the cross bar such that said compression element receives any compressive forces exerted by the cross bar on the support strut; and a tension element means having a tension axis substantially parallel to the cross bar for initially compressing said compression element independent of any loading on the cross bar, and for attaching the cross bar to said junction means such that said tension element means is immovably attached to said junction means and receives any tension forces exerted by the cross bar on the support strut.

3. A terminal point according to claim 2 wherein the support strut is hollow; and wherein said junction means includes at least one junction plate fixedly mounted inside of the support strut along a portion of the longitudinal length thereof.

4. A terminal point according to claim 2 wherein said tension element means includes a pivot means for allowing a limited universal pivoting movement of the cross bar relative to said junction means.

5. A terminal point according to claim 4 wherein said pivot means includes a bearing socket positioned between the cross bar and said compression element.

6. A terminal point according to claim 4 wherein said pivot means further includes an elastic pad positioned between said compression element and the cross bar.

7. A terminal point according to claim 5 wherein the end of the cross bar at said bearing socket is convexly shaped, and wherein said bearing socket has a concave portion which matingly receives the convex end of the cross bar.

8. A terminal point according to claim 2 wherein said compression element includes a tube having an inner end and an outer end, said tube being fixedly secured to said junction means in the support strut.

9. A terminal point according to claim 8 wherein said tension element means includes at least one tie-rod which extends centrally through said tube and which is tensioned between said inner end of said tube and the adjacent end of the cross bar.

10. A terminal point according to claim 9 wherein said outer end of said tube protrudes outwardly beyond the support strut and is attached to the adjacent end of the cross bar.

11. A terminal point according to claim 9 wherein said tie-rod is threaded at the end adjacent the cross bar and a nut is received on the threaded end for initially compressing said compression element.

12. A terminal point according to claim 11 wherein the end of the cross bar is spherical, wherein the outer end of said tube is matingly shaped to receive the spherical end of the cross bar, and wherein said tension element means further includes a spherical element matingly shaped to receive the spherical end of the cross bar located between said nut and the spherical end of the cross bar.

* * * * *